United States Patent [19]
Daniels et al.
[11] Patent Number: 4,466,079
[45] Date of Patent: Aug. 14, 1984

[54] MAILING SYSTEM PERIPHERAL INTERFACE WITH COMMUNICATIONS FORMATTING MEMORY

[75] Inventors: Edward P. Daniels, Bridgeport; Daniel F. Dlugos, Huntington; Flavio M. Manduley, Woodbury, all of Conn.

[73] Assignee: Pitney Bowes Inc., Stamford, Conn.

[21] Appl. No.: 235,252

[22] Filed: Feb. 17, 1981

[51] Int. Cl.³ .............................................. G06F 15/20
[52] U.S. Cl. ...................................... 364/900; 364/466
[58] Field of Search ... 364/200 MS File, 900 MS File, 364/466, 464

[56] References Cited

U.S. PATENT DOCUMENTS

| | | | |
|---|---|---|---|
| 3,635,297 | 1/1972 | Salava | 364/464 |
| 4,079,448 | 3/1978 | N'Guyen et al. | 364/200 |
| 4,079,452 | 3/1978 | Larson et al. | 364/200 |
| 4,084,233 | 4/1978 | Handly et al. | 364/200 |
| 4,084,242 | 4/1978 | Conti | 364/466 |
| 4,131,946 | 12/1978 | Dlugos | 364/466 |
| 4,156,932 | 5/1979 | Robinson et al. | 364/200 |
| 4,212,074 | 7/1980 | Kuno | 364/466 |
| 4,339,807 | 7/1982 | Uchimura et al. | 364/466 |

OTHER PUBLICATIONS

INTEL MCS-80/85 Family User's Manual, *Universal Peripheral Interface 8-bit Microcomputer*, Oct. 1979, pp. 6-158.

*Primary Examiner*—Gareth D. Shaw
*Assistant Examiner*—Daniel K. Dorsey
*Attorney, Agent, or Firm*—Robert H. Whisker; David E. Pitchenik; William D. Soltow, Jr.

[57] ABSTRACT

An interface between a system processor of an automated mailing system and selected peripheral devices carries peripheral support hardware and software for communication with the peripherals. The interface includes a board having a memory wherein programs for formatting communications with the peripherals are stored. A working memory for the temporary storage of commands and data for communication to the peripherals and a peripheral controller for establishing a communications link with a selected peripheral are also carried on the interface board. The inclusion of additional peripheral devices or the substitution of alternate peripheral devices which would require revision of communications formatting programs does not require reprogramming of the system processor and is accommodated by revising the program stored in the interface program memory.

7 Claims, 13 Drawing Figures

MAILING SYSTEM PERIPHERAL INTERFACE WITH COMMUNICATIONS FORMATTING MEMORY

RELATED APPLICATIONS

The present invention deals with a peripheral interface which includes a communications program memory utilized by a system processor for formatting communications with mailing system peripheral devices. Such communications may be established through a peripheral controller as disclosed in the copending application of Daniel F. Dlugos et al entitled Postage Scale Peripheral Interface filed simultaneously herewith and assigned to the assignee of the present invention.

BACKGROUND OF THE INVENTION

1. Field of the Invention

This invention relates generally to mailing systems and more particularly to an interface between a system processor and a plurality of peripheral devices.

2. Further Related Applications

The present invention includes an interface board which interconnects a postage value determining system processor with a plurality of peripheral devices associated with a mailing system. In U.S. Pat. No. 4,308,579, issued to Daniel F. Dlugos entitled Multiprocessor Parcel Postage Metering System Having Serial Data Bus, and assigned to the assignee of the present invention, a postage calculation system having a serial communications controller for communications between the system processsor and peripheral devices was disclosed.

The system included a serial communication bus through which the peripheral devices associated with the mailing system communicated with the system processor. Some peripherals were interconnected to the serial communications bus by a peripheral controller, while a meter setting device was directly linked to the serial communications bus. Appropriate signals were transmitted along a bus attention line when it was desired to have a particular peripheral device receive or transmit via the communications bus. Acknowledgment lines were provided for acknowledging receipt of signals. The communications controller comprised an integral part of the main postage calculator system circuit board.

Since the serial controller was an integral part of the main system circuit board, a purchaser who only wished to acquire a postage scale and not the peripheral devices or not all of the available peripherals was at a cost disadvantage in terms of the serial controller and the memory occupied for peripheral communications formatting programs. In addition, if a malfunction arose, the serial communications controller and the communications bus were not serviceable as a single unit on a separate board.

The sharing of a common communications bus by all peripheral devices made the replacement or substitution of different peripheral devices a formidable task which required reprogramming of the main circuit board for both data and command formatting, as well as protocol and communications routines.

SUMMARY OF THE INVENTION

Support hardware and software for designated mailing system peripheral devices are provided on an interface board. The interface includes a PROM which stores communications formatting programs for designated peripheral devices for use by the system processor. Additionally included on the interface board is a memory for temporary storage of data and a peripheral controller. The controller receives command signals from the system processor and in response to such command signals establishes communications links with a selected peripheral and enters subroutines for the exchange of data between the system processor and the selected peripheral. The interface comprises a physically distinct unit selectively detachable from the processor.

The system processor may comprise a component of a stand alone postage scale. The main scale system board does not include memory for formatting peripheral communications or specific communications subroutines. If a complete mailing system including peripherals is desired, an interface in accordance with the invention is provided and becomes an extension of the main system board.

From the foregoing compendium, it will be appreciated that it is an object of the present invention to provide a communications interface of the general character described between a system processor and peripheral devices associated with a mailing system which is not subject to the disadvantages of the prior art.

Another object of the present invention is to provide an interface of the general character described between a postage value determining system processor and a plurality of mailing system peripheral devices, which interface includes a communications formatting program stored in a memory for use by the system processor.

A further object of the present invention is to provide an interface of the general character described between a postage value determining system processor and a plurality of peripheral devices associated with a mailing system which includes system processor support hardware and software for communicating with the peripheral devices.

A further object of the present invention is to provide a stand alone postage scale having a system processor for determining postage values of articles to be mailed which is relatively low in cost and an interface of the general character described which stores communications formatting programs coordinated with specified peripheral devices.

Other objects of the present invention in part will be obvious and in part will be pointed out hereinafter.

With these ends in view, the invention finds embodiment in certain combinations of elements, arrangements of parts and series of steps by which the objects aforementioned and certain other objects are hereinafter attained, all as more fully described with reference to the accompanying drawings and the scope of which is more particularly pointed out and indicated in the appended claims.

BRIEF DESCRIPTION OF THE DRAWINGS

In the accompanying drawings in which is shown one of the various possible exemplary embodiments of the invention.

DESCRIPTION OF THE PREFERRED EMBODIMENT

Figure 1:
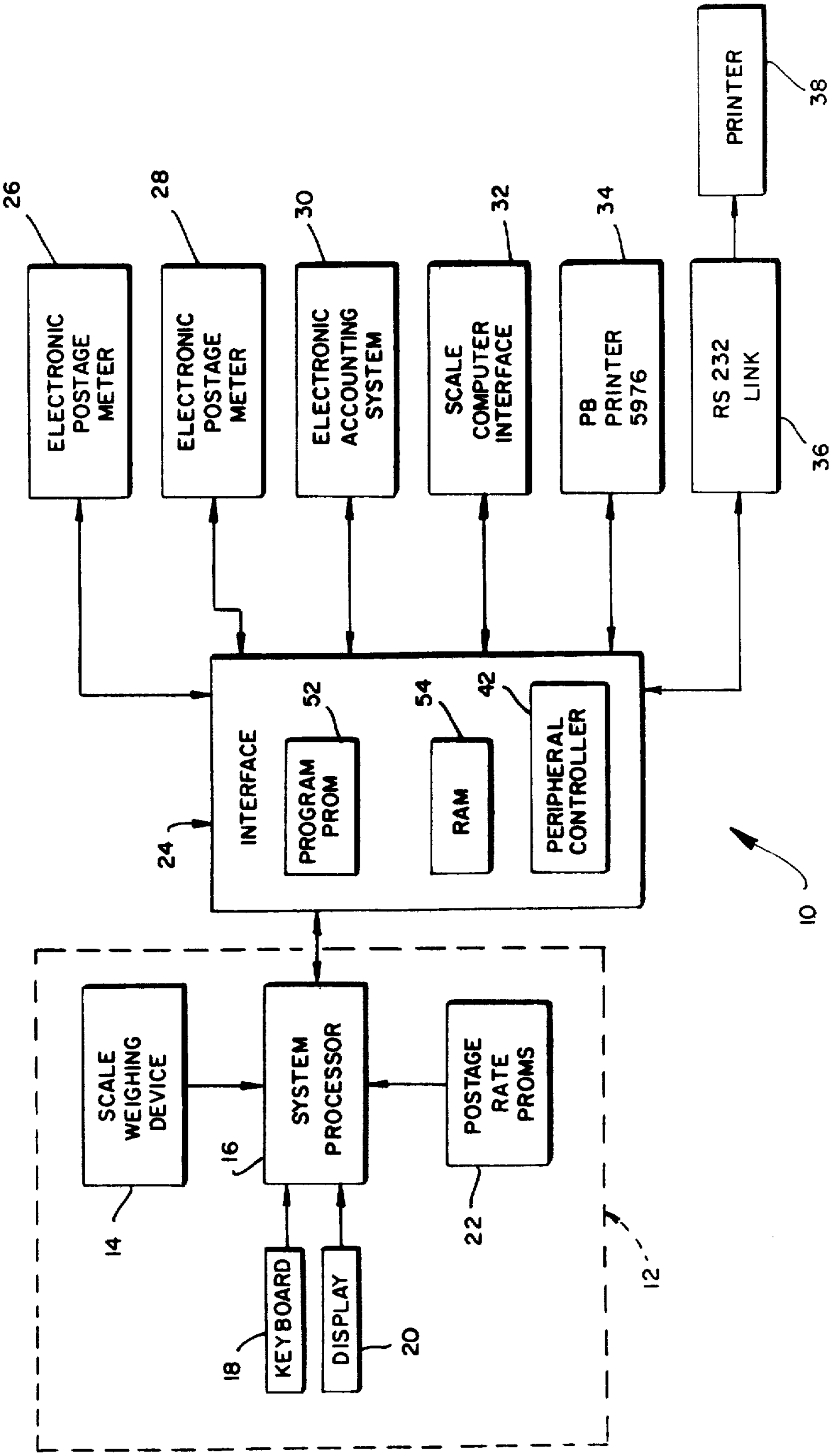
FIG. 1 is a schematized block diagram of a typical mailing system illustrating an interface constructed in accordance with and embodying the present invention interconnecting a postage value determining system processor associated with a postage scale and a plurality of mailing system peripheral devices.

Referring now in detail to the drawings, the reference numeral 10 denotes generally a composite automated mailing system which includes a processor controlled stand alone postage scale 12. The scale 12 includes a weighing device 14 having a tray or platform for receiving an article to be mailed. The weighing device 14 is interconnected to a main system processor 16 which is programmed to determine the requisite postage or other transportation charge for the article. In most instances, transportation charges are based upon the article weight, class of transportation, and the distance to its destination.

The data necessary for the determination of article postage, e.g. destination operands, class of transportation operands, etc. are entered at a keyboard 18 and corresponding signals are transmitted to the system processor 16. Keyboard and calculated information are indicated at a display 20.

Article weight indication signals are generated by a detector at the weighing device 14. The detector may comprise an optical deflection detector or a strain gauge apparatus and a corresponding analog to digital converter, both of which are known to those of skill in the art and which are not part of the present invention hereinafter described.

With the article weight, class of transportation and destination operands entered, the system processor 16 determines the requisite postage by reference to a postage rate PROM 22 and provides a signal to the display 20 for indicating the determined postage amount.

A suitable microprocessor for implementation as the system processor 16 is an Intel 8085 processor available from Intel Corporation of Santa Clara, Calif. The foregoing mode of operation of the scale 12 is well known to those of skill in the art and typically illustrated in U.S. Pat. No. 4,135,662 entitled "Operator Prompting System" issued Jan. 23, 1979 to Daniel F. Dlugos and assigned to the assignee of the present invention.

The postage value determining system processor disclosed in U.S. Pat. No. 4,135,662, supra, was integral with a complete mailing system and transmitted a postage value signal to a meter setting device for setting a postage meter and dispensing the calculated postage. Pursuant to the present invention, the scale 12 is constructed as a stand alone unit which may be employed without peripheral devices associated with a complete mailing system. The scale 12 maintains versatility, however, for controlling, transmitting data to and receiving data or commands from various peripheral devices if a complete mailing system is desired by the user. As such, the scale 12 is available at an economical cost because its circuit board does not include memories allocated to communications formatting programs, memories allocated to the storage of data and commands during formatting routines or an interface for communication with mailing system peripheral devices.

A peripheral controller interface 24 is provided as a separate self-contained circuit board carrying support hardware as well as software for formatting communications to and establishing communications links between the system processor 16 and various peripheral devices. Among the various peripheral devices which may be employed as part of a composite automated mailing system are one or more electronic postage meters 26, 28. The meter 26 is adapted to dispense United States Postal Service postage denominations while the meter 28 is adapted to print private carrier transportation charges, e.g. United States Parcel Service.

Electronic postage meters of this type are described in U.S. Pat. No. 3,978,457 entitled Microcomputerized Electronic Postage Meter System issued August 31, 1976 to Frank P. Check, Jr., et al and assigned to the assignee of the present invention. Additional electronic postage meters of this type include the electronic postage meter disclosed in copending application Ser. No. 89,413 filed Oct. 30, 1979.

The electronic postage meters 26, 28 are programmed for communication with the system processor 16 pursuant to the communications routine disclosed in the copending application Ser. No. 89,413. Such communications routine is serial character asynchronous, bit synchronous, in message form, with the bits of the message being timed in accordance with the given schedule. The messages are returned or echoed by the recipient bit by bit for checking. This communications routine has been designated "Echoplex".

Further peripheral devices which are programmed for communication with the system processor 16 through the peripheral controller interface and employing the Echoplex communications routine include an electronic accounting system 30, a scale computer interface 32 and a Pitney Bowes Model 5976 printer 34.

In addition, a communication link 36 is provided for communications employing an RS 232 hardware standard. The RS 232 communications link 36 may interface with one of several available RS 232 printers 38 or any other desirable peripheral device which communicates in ASCII code, for example. Generally, a mailing system 10 would employ only one printer, i.e. either the printer 34 or the printer 38 would be employed.

Figure 2:
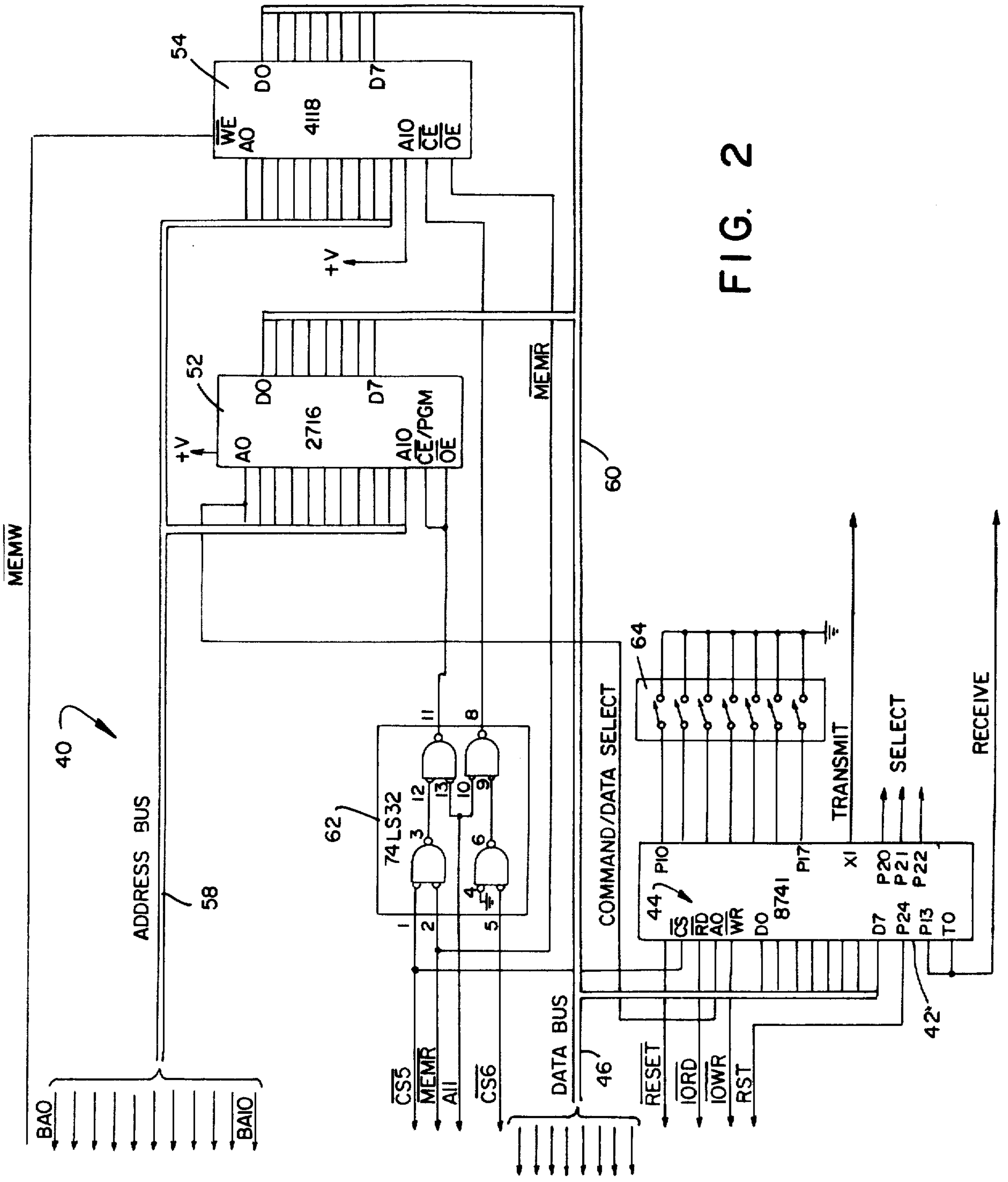
FIG. 2 is a schematic illustration of the interface circuit with portions deleted and illustrating a PROM which stores programs for formatting communication between the system processor and the peripherals, a data RAM for temporary storage of data for communication to the peripherals and a peripheral controller which establishes communications links between the system processor and a selected peripheral.

In FIG. 2 a schematized circuit diagram of a peripheral controller interface board 40 is illustrated omitting, however, a portion of the circuit between a peripheral controller 42 and the selected peripheral devices. The peripheral controller 42 may comprise a universal peripheral interface such as an Intel type 8740 or 8741 8 bit microcomputer. The controller 42 receives control or command signals through a plurality of input lines denoted generally by the reference numeral 44. Data communication between the system processor and the controller is generally carried over a DATA BUS 46 which is connected to a plurality of data bus buffer lines (pins designated D0 through D7). The controller 42 includes a CPU section, a program memory and buffers for commands and data flowing between the CPU section and the system processor 16.

Communication between the controller 42 and various peripheral devices may be accomplished by multiplexing a TRANSMIT and a RECEIVE line 48, 40, respectively, among the peripheral devices. This technique and accompanying circuits are fully described in the copending related application filed simultaneously herewith entitled Postage Scale Peripheral Interface and incorporated herein by reference. As discussed in said copending application, multiplexers are employed for interconnecting specific communications lines between a selected peripheral device and the controller TRANSMIT or RECEIVE line. It should be appreciated that alternately communication between peripheral devices and the controller 42 may be accomplished through a serial bus such as that disclosed in the copending application Ser. No. 13,734 entitled Multiprocessor Parcel Postage Metering System Having Serial Data Bus.

In accordance with the invention, the interface board 40 carries a memory 52 which stores communications formatting programs for use by the system processor 16 for communicating with the peripheral devices. In addition, a working memory 54 is provided for the temporary storage of commands and data to meet the requirements of the communications formatting programs.

The program memory 52 is indicated in an exemplary manner as comprising an erasable PROM, while the command/data working memory 54 is indicated as comprising a RAM. Memory location in both the program memory 52 and the command/data memory 54 are accessed through an ADDRESS BUS 58 from the system processor 16. Similarly, the DATA BUS 44 from the system processor 16 includes a branch 60 for reading the data stored in the program memory at the designated pins D0 through D7. The branch 60 of the DATA BUS additionally extends to the data in/data out pins of the command/data memory 54 for writing data into the RAM and for the reading of stored data by the system processor 16.

A decoder 62 comprising a plurality of gates is positioned between control output lines of the system processor 16 and the memories 52, 54. To obtain data stored at a particular location in the program memory 52, the address of such data is loaded through the address bus 58 and appropriate signal levels are applied to a chip select and a memory read line ($\overline{CS}$ 5 and $\overline{MEMR}$). The decoder then provides a low signal at the $\overline{CE}$ and $\overline{OE}$ (chip enable and output enable) pins of the program memory 52. The program data stored at the location addressed through the ADDRESS BUS will then appear on the DATA BUS branch 60 and is available to the system processor 16 for formatting communications to the peripherals.

Similarly, by providing appropriate signals on the $\overline{WE}$ and $\overline{OE}$ (write enable and output enable) pins of the command/data memory 54, data can be written into or read from memory locations addressed through the ADDRESS BUS 58.

In accordance with the present invention, the system processor 16, e.g. the Intel 8085 processor, will utilize communications formatting programs stored in the program memory and temporarily store data and commands in the memory 54 for the purpose of communicating with a selected peripheral. The system processor will thus format appropriate command signals and data which it transmits to the peripheral controller 42.

As more fully described in the copending related application filed simultaneously herewith entitled Postage Scale Peripheral Interface, the controller 42 may comprise a peripheral microcomputer, the TRANSMIT and RECEIVE lines of which are multiplexed among selected peripherals. To transmit data to a selected peripheral, the system processor 16 provides a command write signal to the controller 42 and subsequently loads data into a transmit buffer of the controller. After verification of the accuracy of the reception of such data, the system processor provides a transmit command which designates the appropriate channel for the selected peripheral. In response to the transmit command, the controller proceeds with establishing a communications link with the selected peripheral and transmits the data stored in its transmit buffer to the peripheral while employing an appropriate communications subroutine.

If a transmit and receive command is generated by the system processor 16, the controller 42 thereafter awaits a return transmission of data from the peripheral and stores such data in a receive buffer. Upon receipt of a read command from the system processor, the data stored in the receive buffer is loaded into the system processor.

When a dollar value amount is transmitted to an electronic postage meter, the controller 42 awaits receipt of a verification indicating the amount which has been set. Upon receipt of a trip command from the system processor, the controller transmits a trip signal to a mailing machine for tripping the meter and then awaits receipt of a meter trip complete signal.

A plurality of communications subroutines are stored in the controller program memory to provide versatility in the selection of peripheral devices which may be employed.

When the interface board 40 is connected to the system processor 16, the system processor will be augmented with not only the controller 42 which is programmed to assume communications protocol programs relating to the establishment of the actual communications links, the transfer of data and commands and verification of the accuracy but in addition, formatting programs and a command/data memory for communication with the user selected peripherals.

When the mailing system 10 includes postage meters, the program memory 52 will include formatting data for setting a determined postage amount in a specified meter and for tripping the meter. If the mailing system includes an electronic accounting system, the program memory 52 will include formatting data for the desired accounting functions, e.g. debitting a customer's account number, batch number counting, etc. Additional formatting program data is stored in the program memory 52 for appropriate communication with available user selected peripheral devices.

Furthermore, as more fully described in the copending related application entitled Postage Scale Peripheral Interface, the interface board 40 includes a switch bank 64. Selected switches of the bank are opened or closed to indicate the nature of a peripheral device which is included in the system. For example, different types of RS 232 printers are available, one of which includes a "busy" signal and the other of which does not. Upon an appropriate command signal from the system processor 16, the controller 42 reads the switch bank 64 and transmits such switch bank reading to the system processor.

In FIGS. 3 through 13, a basic routine for communications formatting for a postage meter setting operation by the system processor 16, e.g. Intel 8085, is depicted in a flow chart format. After the system processor has determined a dollar value, the value is initially loaded into memory locations designated OUTBUF-2 and OUTBUF-3 of the command/data memory 54. The program then inquires whether the dollar value is to be dispensed as United Parcel Service transporation charges. If not, the number 4 is stored in location port no.; while if UPS is to be the carrier, a different number is stored in location port no. At this juncture, the program calls a meter setting subroutine designated MTRSET and illustrated in FIG. 4.

Figure 5:
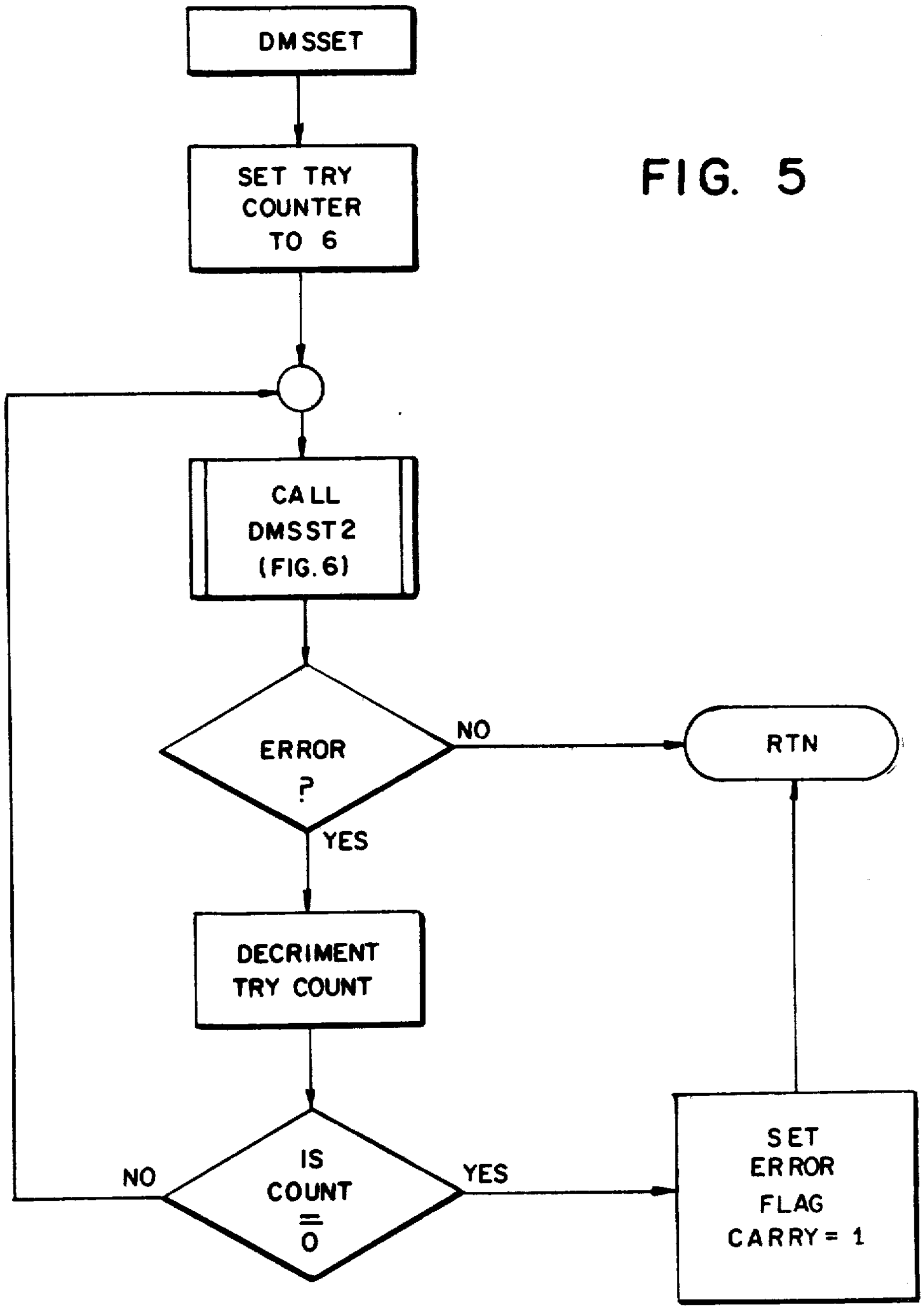
Figure 6:
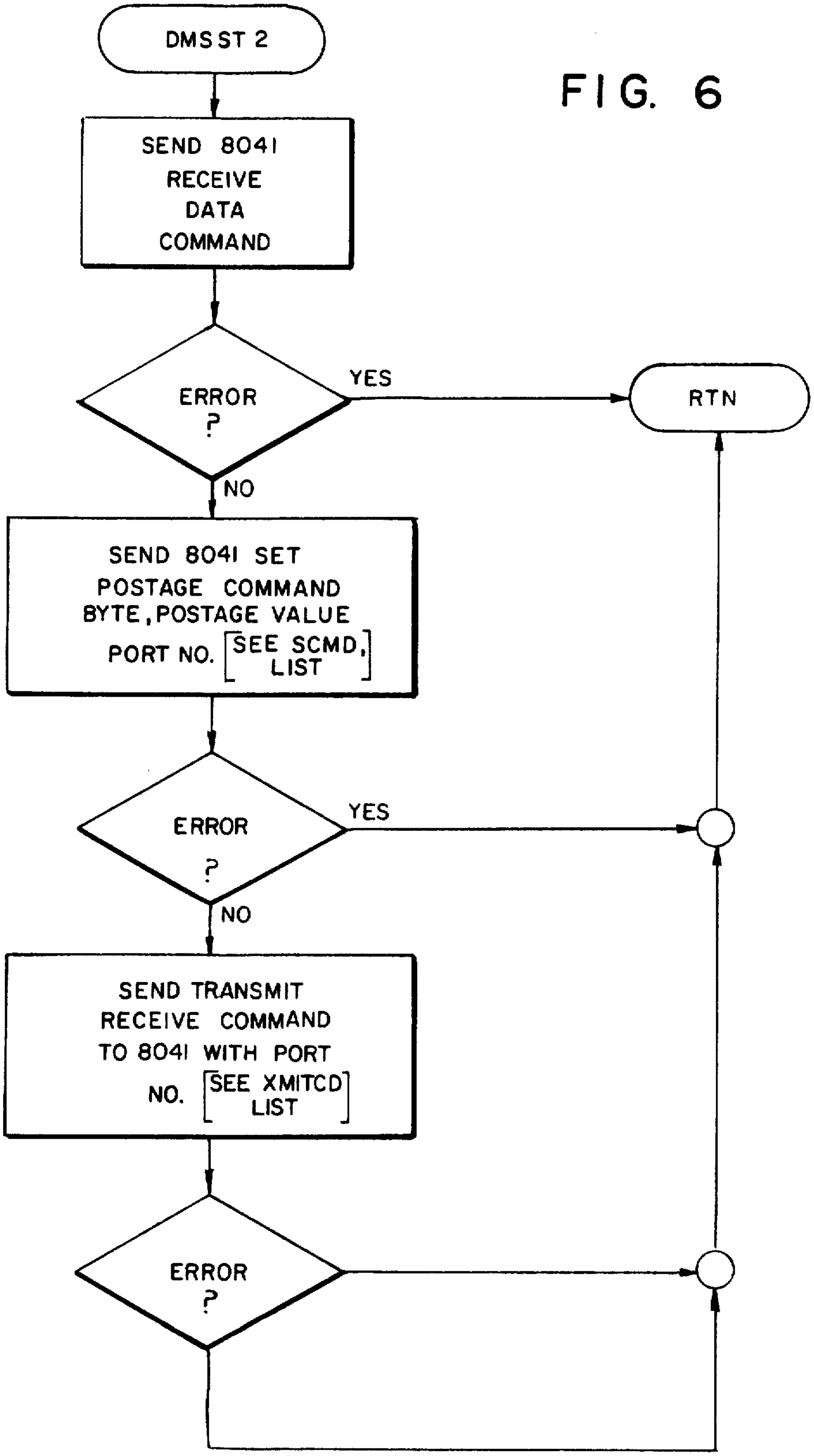
Figure 7:
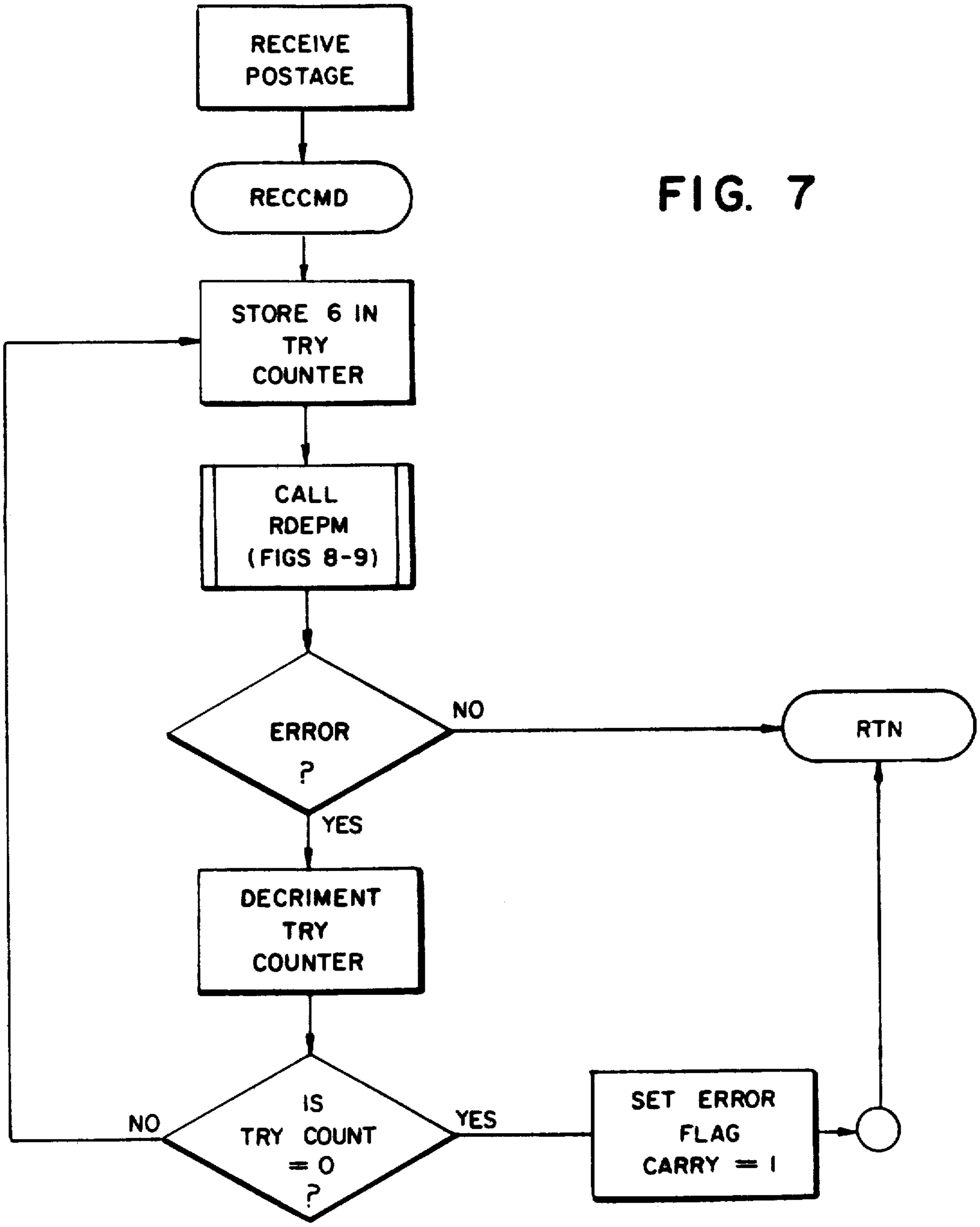
Figure 8:
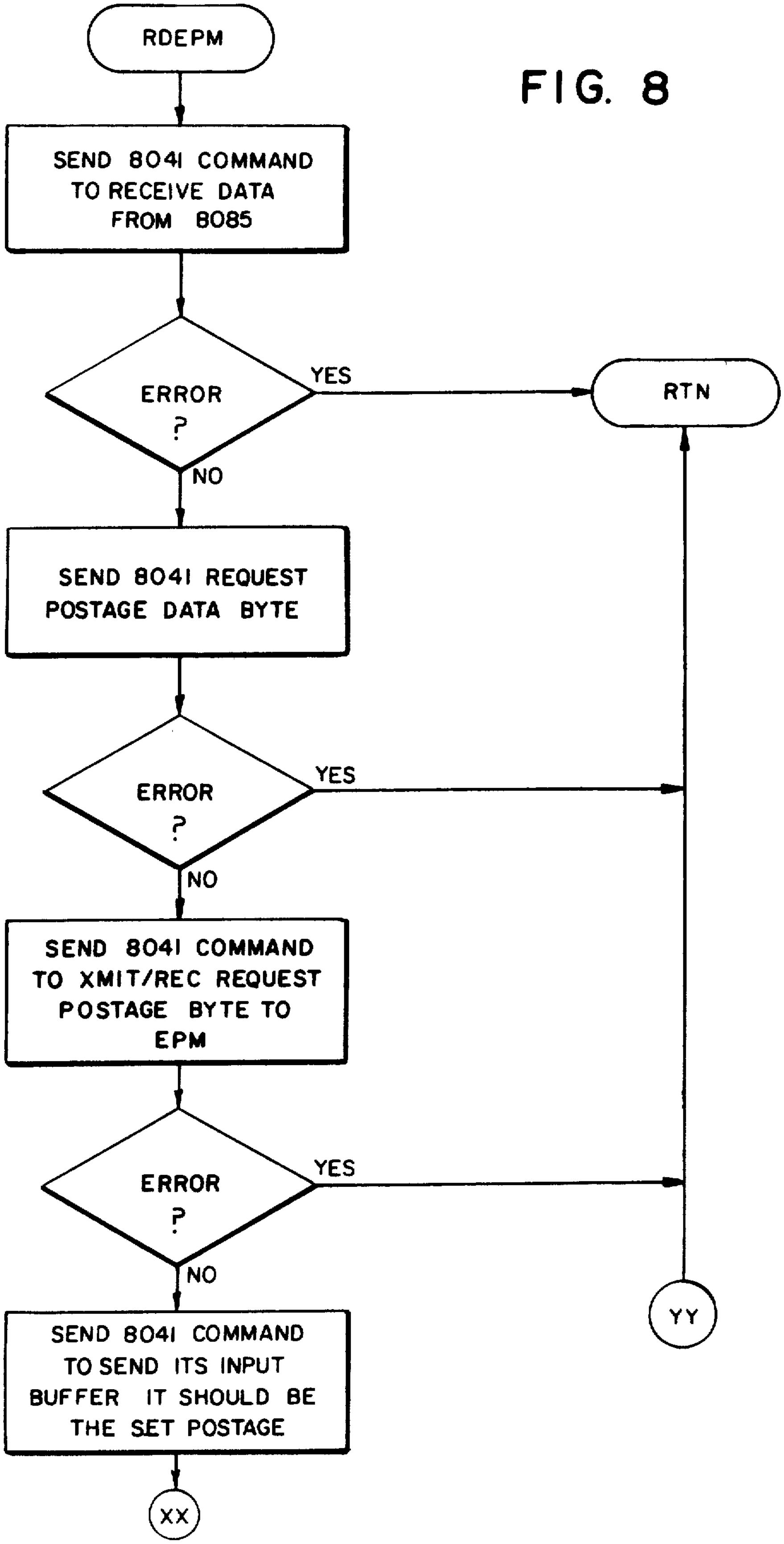
Figure 9:
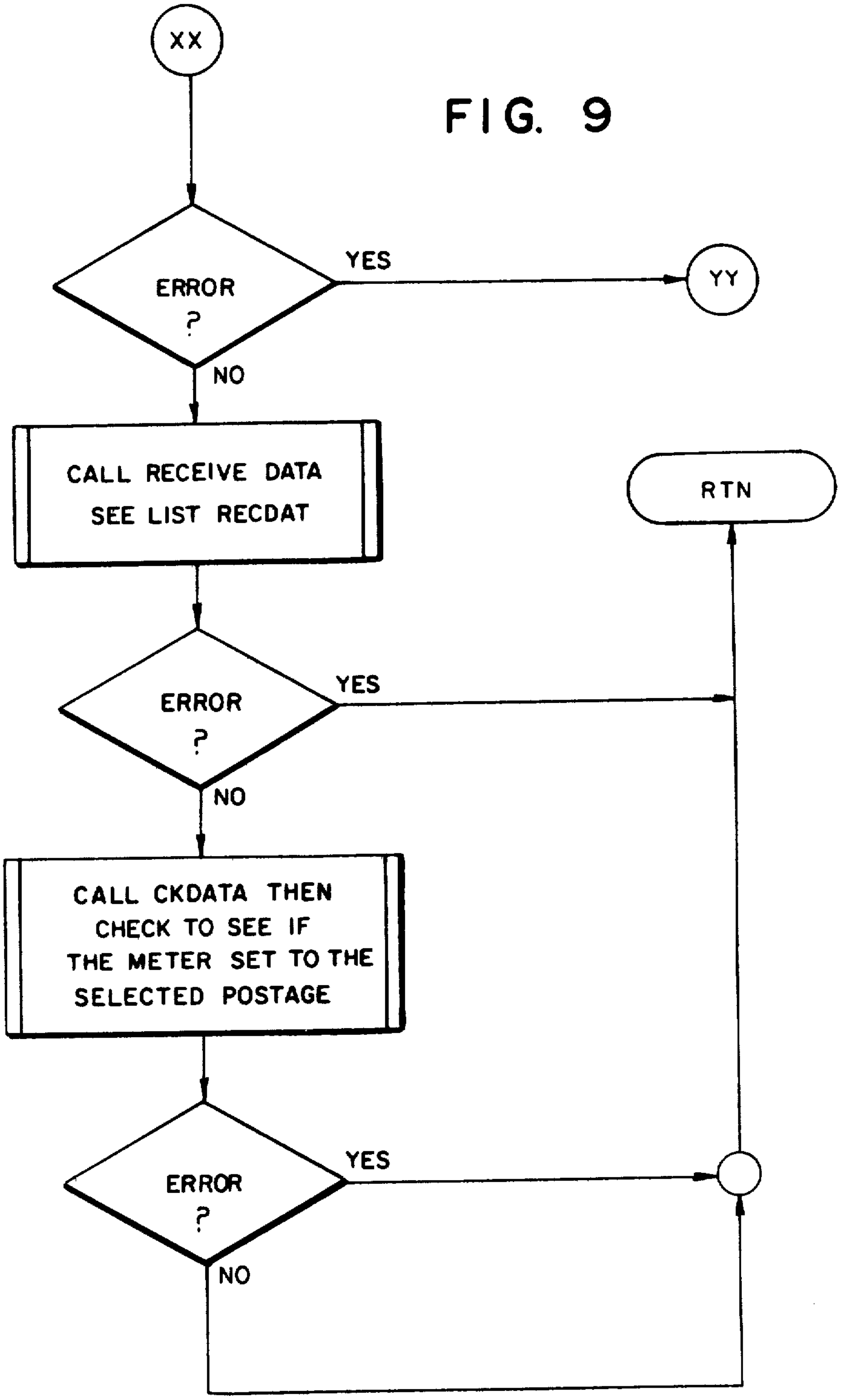
Figure 10:
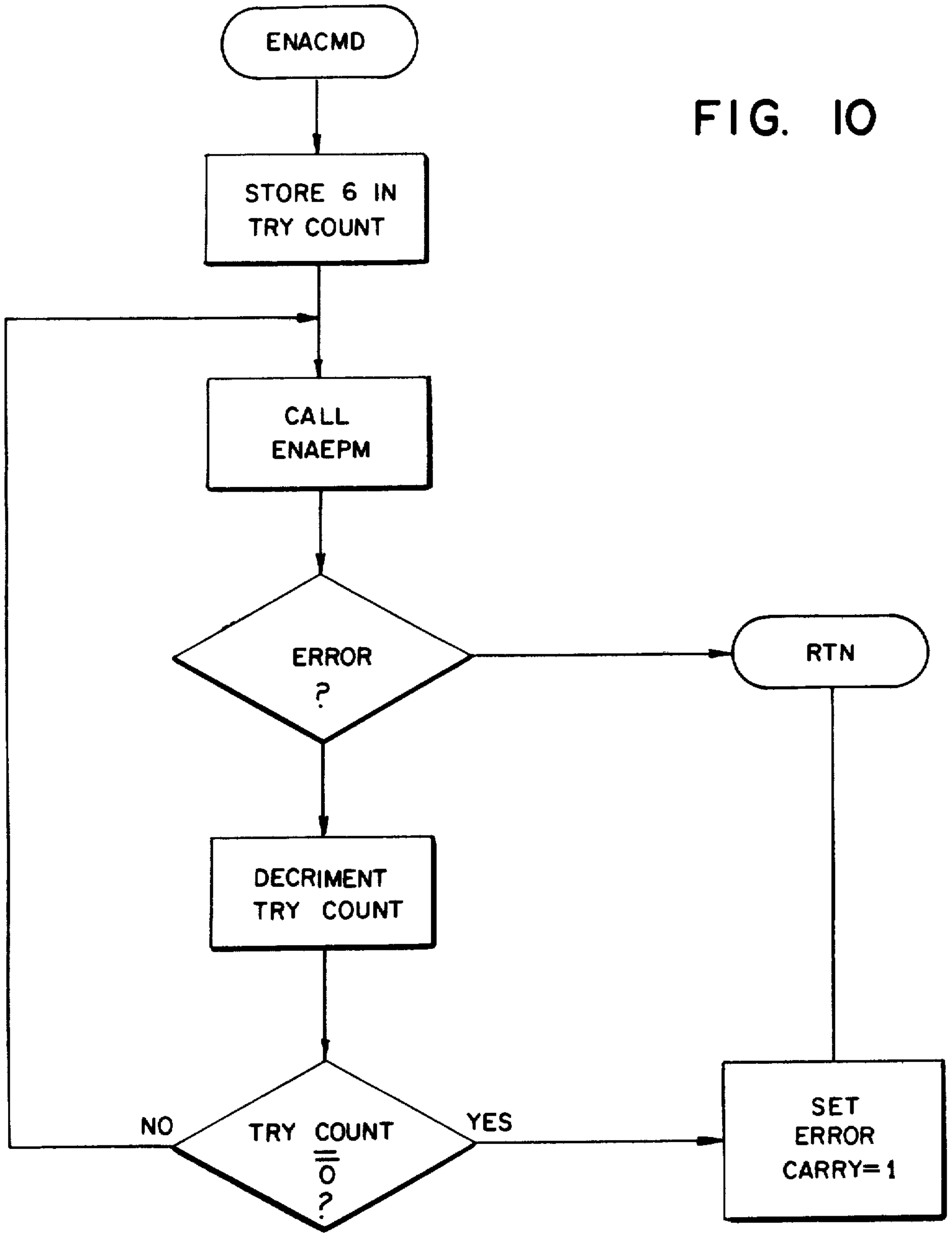

Upon entering MTRSET, the program calls a "decision making scale set" subroutine illustrated in FIG. 5. Such subroutine permits a given number of attempts, e.g. six, at setting the selected meter. After setting a try counter, this subroutine calls a further decision making scale set subroutine designated DMSST 2 and illustrated in FIG. 6.

The DMSST 2 subroutine entails initially transmitting a command to the controller 42 (the Intel 8041 microcomputer) to receive data. If there was an error in transmission of such command, the program returns and, as illustrated in FIG. 5, the counter is decremented and a further attempt is made.

In the event the receive data command was transmitted and received successfully, the program then sends a set postage command byte, the postage value and the port no (meter designation) to the controller 42. In the event there was an error in receiving such transmission, the program return as indicated in FIG. 5, the try count is decremented and the program re-enters DMSST 2.

In the event the prior transmission of the set postage command byte, postage value and port no was successful and was received at the controller 42, the program then sends a transmit/receive command to the controller 42 with the meter identification (port no). The program thereafter returns.

Figure 4:
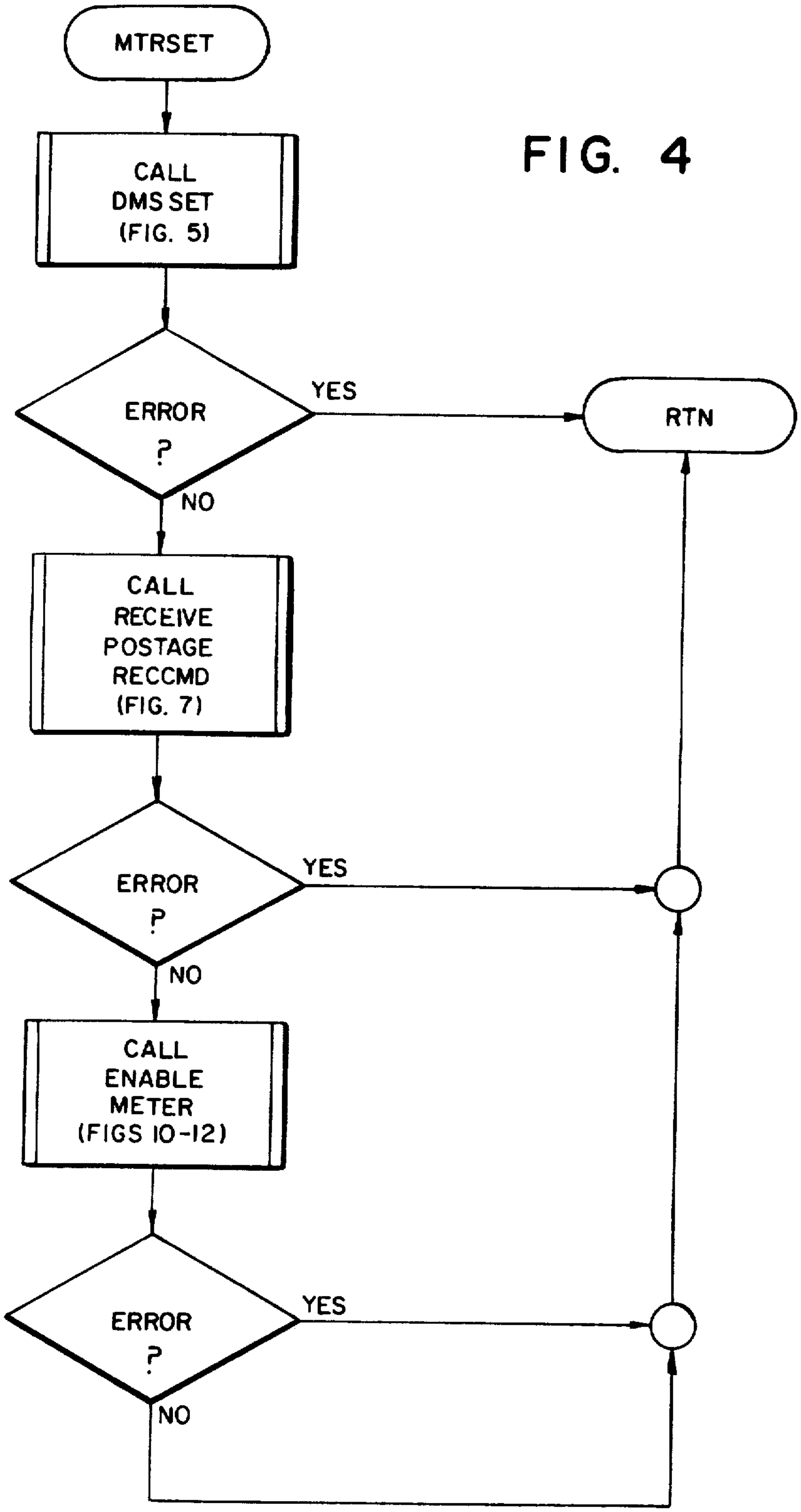

Upon returning to the MTRSET routine from the call DMSSET subroutine as indicated in FIG. 4, an inquiry is made as to whether or not an error occurred in the DMSSET subroutine. If there were no errors, the program then calls a RECEIVE POSTAGE subroutine.

At this juncture, the meter has been set and verification is necessary to determine that it has been set to the proper amount. The formatting routine thereafter enters a CALL RECEIVE POSTAGE subroutine indicated generally in FIG. 7. Such subroutine commences with storing a number in a try counter which will be the maximum number of attempts to receive the postage meter reading, e.g. six. The program then enters a read electronic postage meter routine (RDEPM) indicated in FIGS. 8 and 9.

Upon entering the RDEPM subroutine, the program transmits a command to the controller 42 to receive data from the system processor. An error check is then performed to determine whether the command has been received. If the command has been received, the program then transmits a request for the postage set in the meter. A further inquiry is then made with regard to the occurrence of errors in the transmission and receipt of the request command. In the event there have been no errors, the system processor transmits a command to the controller 42 to transmit the request postage byte to the designated postage meter. The controller 42 then transmits the byte in accordance with the established communications protocol, e.g. an Echoplex routine.

Inquiry is then made with regard to any errors occurring in the transmission or reception of the request postage byte to the controller 42. In the event there have been no errors, the postage meter will transmit its reading to the read or input buffer of the controller 42.

At this point a further command is transmitted to the controller 42 to transmit its input buffer data to the system processor. This data transmitted should be the postage value which was desired to have been set. An inquiry is then made as to whether or not there has been an error in the reception of this command. In the event there has been no error, the program enters a RECEIVE DATA subroutine followed by an error inquiry. In the event there has been no error, the program then determines whether the data received equates with the desired meter setting. Thereafter, the program returns as indicated in FIG. 4 and a determination is made as to whether any error flags have been set.

Figure 11:
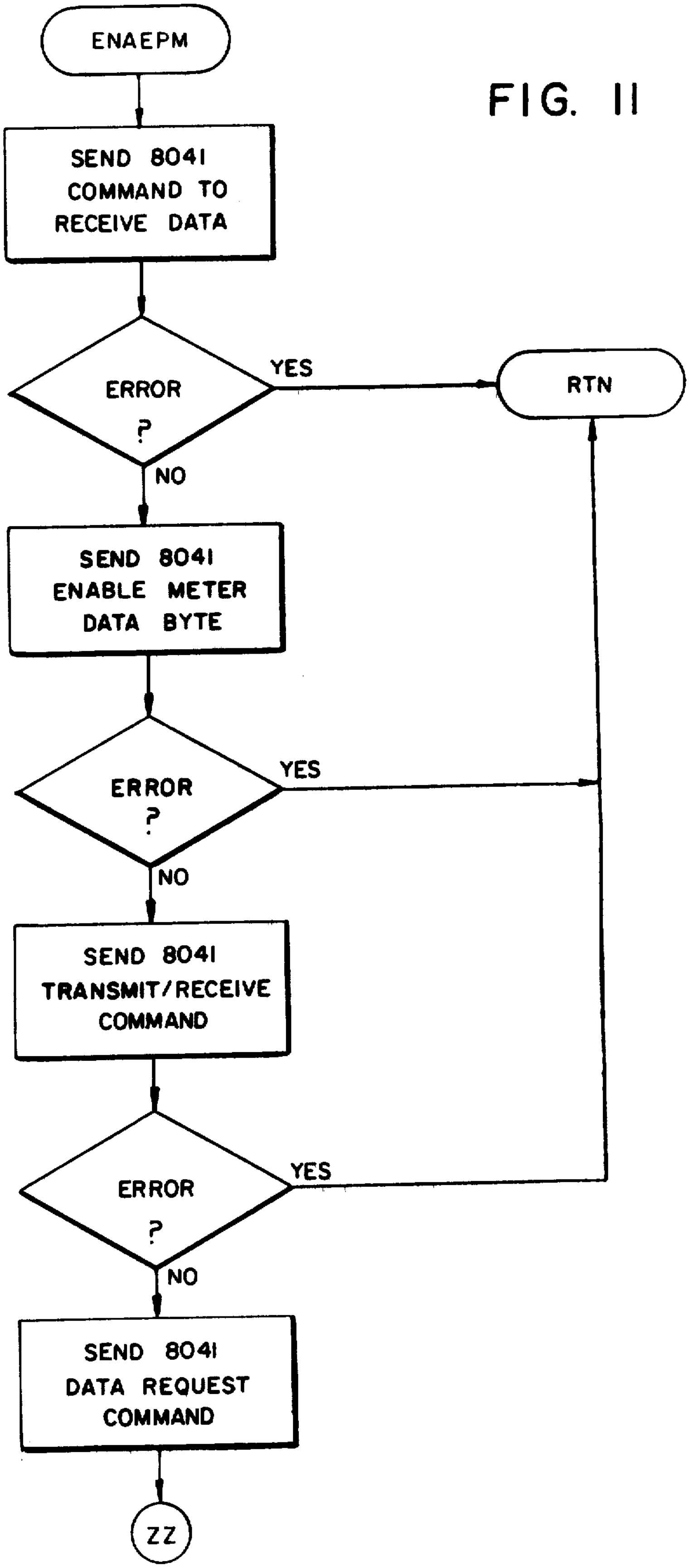
Figure 12:
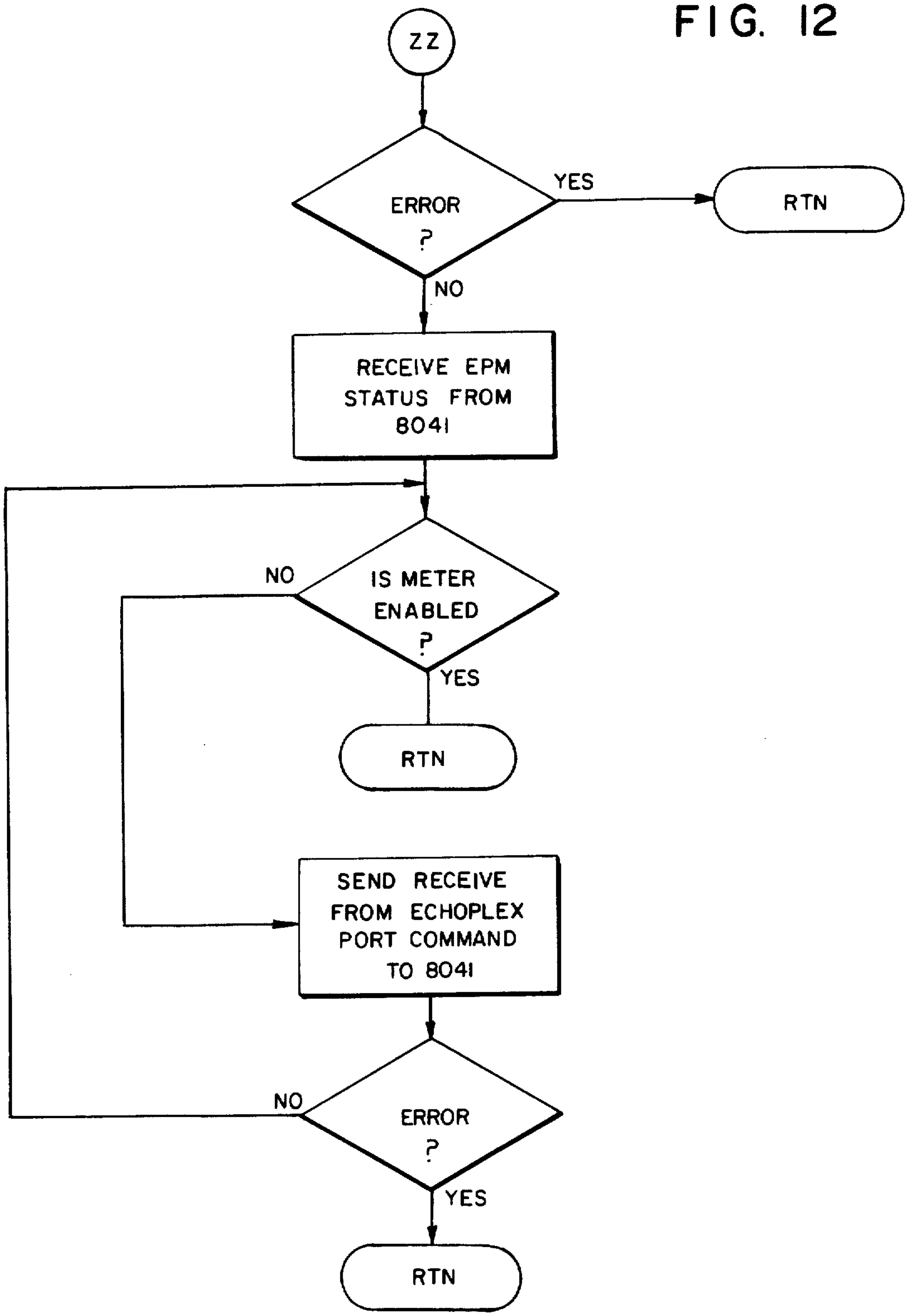

In the event there have been no errors, it has been determined that the postage meter has been set to the desired value and an ENABLE METER subroutine is entered which is indicated generally in FIGS. 11 and 12.

Upon entering the ENABLE METER (ENAEPM) subroutine, the system processor transmits a command to the controller 42 to receive data. After verification of the reception of such command, the system processor transmits an ENABLE METER data byte to the controller 42. After a further inquiry is made regarding any errors occurring in the reception of the ENABLE METER data byte, the program transmits a transmit/receive command to the controller 42. After a further error inquiry, a data request command is transmitted to the controller 42 and the program again makes an error inquiry.

The controller 42 has received, pursuant to its own program, a status indication from the electronic postage meter which is now requested by the system processor. Thereafter, an inquiry is made with regard to whether or not the meter is enabled. In the event the meter is enabled, the program returns while, if the meter has not been enabled, the command is transmitted to the controller 42 to receive the meter enabled status from the meter. If there was no error in reception of the last command, the program returns and again inquires as to whether or not the meter has been enabled.

Figure 3:
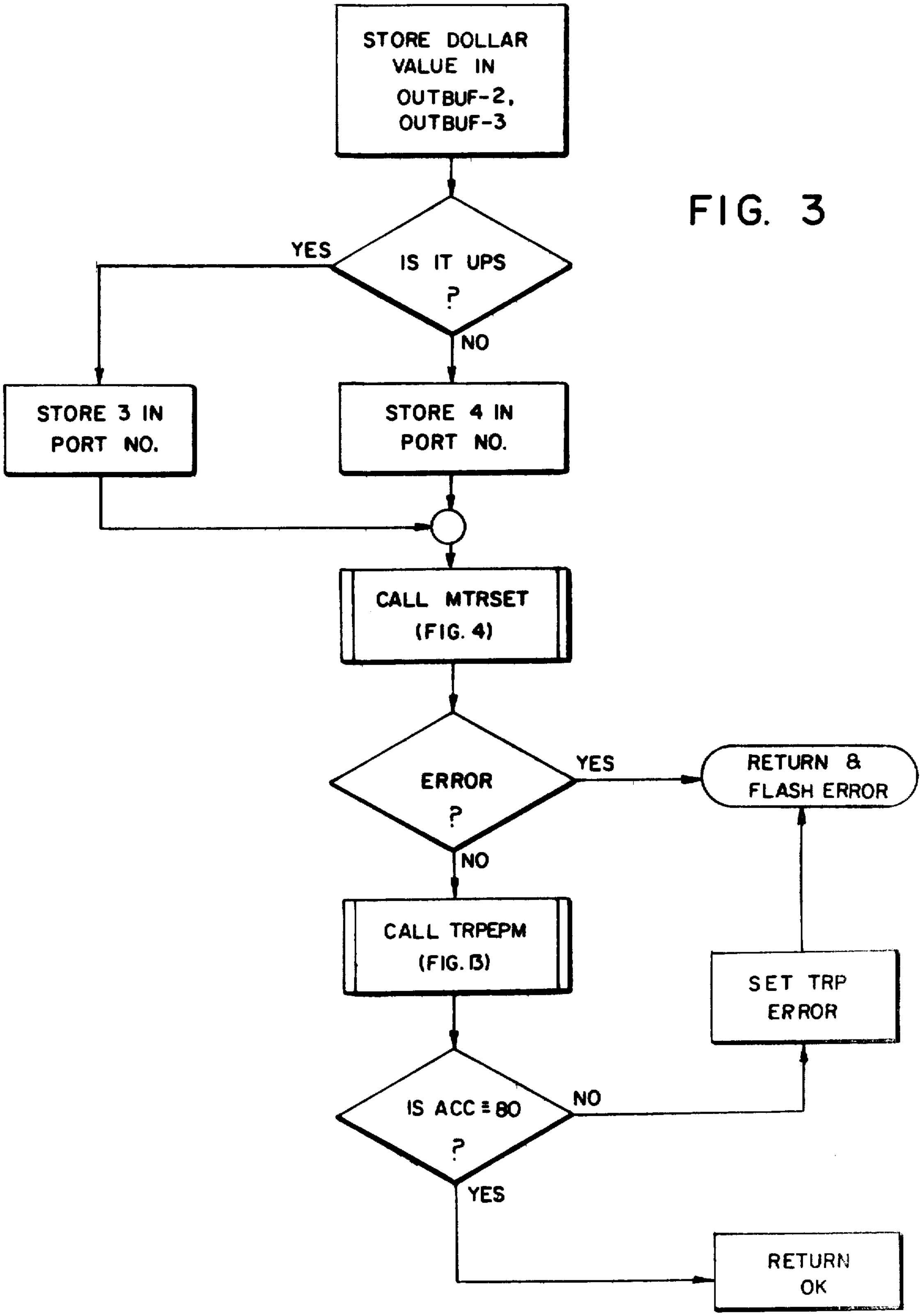
FIG. 3 through FIG. 13 comprise flow charts depicting typical system processor subroutines for setting a postage meter in accordance with the invention.

The program eventually returns from the ENABLE METER subroutine to the MTRSET subroutine (FIG. 4), an error inquiry is made and then the program returns to the main routine of FIG. 3.

Figure 13:
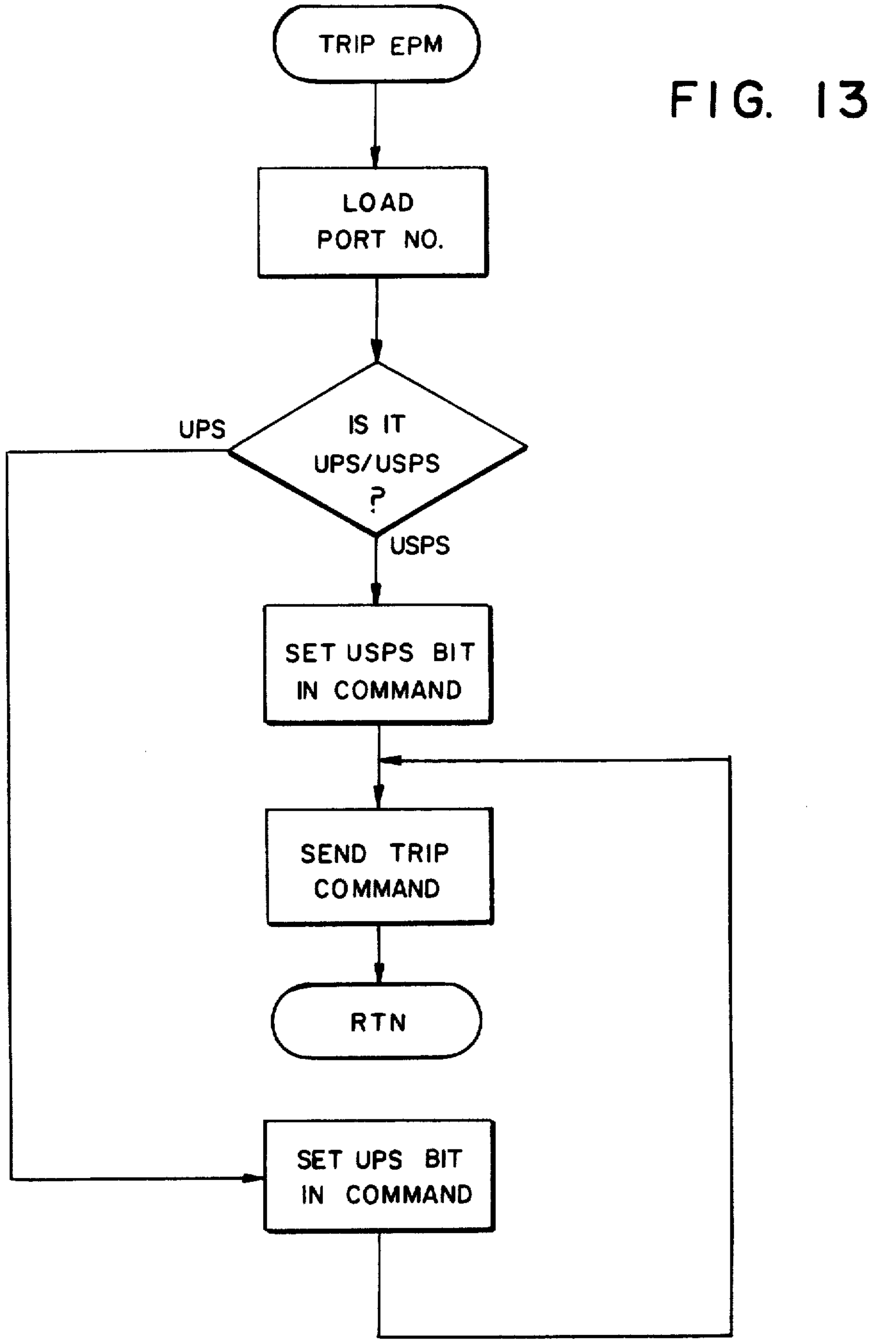

At this juncture, a further error inquiry is made and, if no error flags have been set, the program calls a trip meter (TRPEPM) subroutine indicated in FIG. 13. Upon entering the TRPEPM subroutine, the system processor loads the meter designation (port no) into the controller 42 and then inquires as to whether or not the port no is 3 (UPS) or 4 (USPS). In the event USPS postage is to be dispensed, a USPS bit is set in the command and a mailing machine trip command is transmitted to the controller 42. Thereafter, the program returns. In the event the UPS meter is to be set, the UPS bit is set in the command and a trip command is transmitted to the controller. The trip status will be indicated in the accumulator upon return of the program from the trip subroutine.

Upon returning to the main routine from the TRPEPM, an inquiry is then made whether or not the accumulator sum is the designated amount, e.g. 80; and if so, the program returns. In the event the accumulator sum is not the predesignated amount, a trip error flag is set, the program returns and an error signal is flashed.

It should be appreciated that the routine hereindescribed is merely exemplary of one of the communications routines stored in the program memory 52. Further routines for communicating with other peripheral devices are also stored in the program memory.

Appended hereto as an exhibit is a complete program listing of the meter setting routine illustrated.

It should be understood that, as included herein, the terms mail and postage relate not only to governmental postal services and charges for such services but also to nongovernmental transport services including common carriers, private carriers and the transportation charges imposed by such entities.

Further, the term "data" should be considered as including more than numeric data but, in addition, any information exchanged between the peripheral devices and the system processor including commands such as those described in conjunction with the various routines and subroutines.

As various changes might be made in the interface and mailing system as set forth herein, it is to be understood that all matter herein described or shown in the accompanying drawings is to be interpreted as illustrative and not in a limiting sense.

Thus, it will be seen that there is provided a mailing system peripheral interface which achieves the various objects of the invention and which is well suited to meet the conditions of practical use.

Having thus described the invention, there is claimed as new and desired to be secured by Letters Patent:

1. An interface for transmitting a postage value signal between a mailing system processor and a plurality of mailing system peripheral devices, the interface comprising a peripheral interface controller and means operatively interconnecting the controller and the peripheral devices, the interface further comprising system processor program memory means, the program memory means consisting essentially of a plurality of memory storage locations storing information for formatting communications between the system processor and the peripheral devices at selected memory storage locations, the system processor including means for addressing the selected memory storage locations and means for retrieving the communications formatting information stored at such locations, the system processor formatting communications for a selected peripheral device in accordance with the retrieved formatting information and transmitting such formatted communications to the controller, the controller receiving such formatted communications and in response thereto establishing a communications link with the selected peripheral device, said interface comprising a unitary, physically distinct unit selectively detachable from said processor.

2. An interface constructed in accordance with claim 1 wherein the communications comprises command signals and data signals.

3. An interface constructed in accordance with claim 1 wherein formatting information for different peripheral devices is stored at different selected locations.

4. An interface constructed in accordance with claim 1 further including working memory means for storing communications for use by the system processor during formatting in accordance with the retrieved formatting information, the interface further including means operatively interconnecting the system processor and the working memory means for entering communications to be transmitted to a selected peripheral into the working memory means and means operatively interconnecting the system processor and the working memory means for retrieving such entered communications in accordance with the retrieved formatting information.

5. A mailing system constructed in accordance with claim 1 further including a scale, means operatively interconnecting the scale and the mailing system processor, the mailing system further including a plurality of peripheral devices, one of the peripheral devices comprising a postage meter.

6. A mailing system constructed in accordance with claim 5 wherein the peripheral devices comprise a pair of postage meters, one postage meter including means for dispensing postage denominations for mail service and the other postage meter including means for dispensing transporation fees charged by other than mail service carriers.

7. A system comprising:

(a) a scale weighing device;

(b) a system processor operatively connected to said scale weighing device, said system processor determining postage values corresponding to the weights of items to be mailed weighed on said scale weighing means; and (c) an interface as described in claim 1 operatively connected to said processor, whereby said scale weighing device and said system processor may be used separately to form a stand alone postage scale and alternatively may be connected to said interface to enable said system processor to communicate with selected peripheral devices.

* * * * *